(12) United States Patent
Hong (10) Patent No.: US 9,609,705 B2
(45) Date of Patent: Mar. 28, 2017

(54) SWITCHING CONTROL CIRCUIT, LIGHT APPARATUS COMPRISING THE SAME AND SWITCHING CONTROL METHOD

(71) Applicant: Magnachip Semiconductor, Ltd., Seoul (KR)

(72) Inventor: Seung Woo Hong, Seoul (KR)

(73) Assignee: MagnaChip Semiconductor, Ltd. (KR)

( * ) Notice: Subject to any disclaimer, the term of this patent is extended or adjusted under 35 U.S.C. 154(b) by 0 days.

(21) Appl. No.: 15/159,356

(22) Filed: May 19, 2016

(65) Prior Publication Data

US 2016/0366736 A1 Dec. 15, 2016

(30) Foreign Application Priority Data

Jun. 12, 2015 (KR) .................. 10-2015-0083499

(51) Int. Cl.
| | | |
|---|---|---|
| *H05B 33/08* | (2006.01) | |
| *H02M 1/08* | (2006.01) | |
| *H02M 3/157* | (2006.01) | |
| *H02M 1/44* | (2007.01) | |
| *H02M 3/156* | (2006.01) | |
| *H02M 1/00* | (2006.01) | |

(52) U.S. Cl.
CPC .......... *H05B 33/0815* (2013.01); *H02M 1/08* (2013.01); *H02M 1/44* (2013.01); *H02M 3/156* (2013.01); *H02M 3/157* (2013.01); *H05B 33/0842* (2013.01); *H02M 2001/0009* (2013.01)

(58) Field of Classification Search
CPC  H05B 33/08; H05B 33/0815; H05B 33/0839; H05B 33/0842; H02M 3/156; H02M 3/157; H02M 3/335; H02M 1/08
USPC ..... 315/224, 291, 297, 307, 312; 363/21.01, 363/21.11, 21.12, 21.18
See application file for complete search history.

(56) References Cited

U.S. PATENT DOCUMENTS

| | | | | |
|---|---|---|---|---|
| 8,941,328 | B2 * | 1/2015 | Wu ..................... | H05B 33/0812 315/297 |
| 2006/0250827 | A1 * | 11/2006 | Chu ................... | H02M 3/33507 363/21.12 |
| 2008/0259655 | A1 * | 10/2008 | Wei ....................... | H02M 3/335 363/21.18 |
| 2012/0161738 | A1 * | 6/2012 | Nakashima ........... | H02M 3/158 323/284 |
| 2013/0154493 | A1 * | 6/2013 | Liang ................. | H05B 33/0815 315/201 |

* cited by examiner

Primary Examiner — Thai Pham
(74) Attorney, Agent, or Firm — McGuireWoods LLP (57) ABSTRACT

A switching control circuit includes a switching trigger unit that receives a sensing voltage, which senses a driving current that includes a first and second driving current sections, and that provides a first switching trigger signal based on the sensing voltage in the second current section, an off-time control unit configured to provide a second switching trigger signal in the first driving current section to control a maximum off-time of a driving switching element and a switching control unit configured to turn on the driving switching element based on the first or second switching trigger signal.

20 Claims, 6 Drawing Sheets

SWITCHING CONTROL CIRCUIT, LIGHT APPARATUS COMPRISING THE SAME AND SWITCHING CONTROL METHOD

CROSS-REFERENCE TO RELATED APPLICATIONS

This application claims priority to and the benefit thereof from Korean Patent Application No. 10-2015-0083499, filed on Jun. 12, 2015, in the Korean Intellectual Property Office, the entire disclosure of which is incorporated herein by reference for all purposes.

BACKGROUND OF THE DISCLOSURE

1. Field

This disclosure relates generally to a switching control circuit, and more particularly to driving a switching control circuit for a lighting apparatus.

2. Description of Related Art

Some power factor correction converters operate in a continuous conduction mode and a boundary conduction mode. In the continuous conduction mode, a fixed frequency is used to control an inductor current (or a driving current). In the boundary conduction mode, a variable frequency signal is used to turn on a driving switch when the inductor current reaches a zero.

A light emitting diode (LED) lighting apparatus may be driven by a switching converter, of which types include a buck-type, a boost-type, and a buck-boost-type. The boost-type switching converter has been commonly used, but recently the buck-type switching converter has also become popular for being implementable in an integrated circuit (IC) in a cost effective manner. The switching converters may be classified by the ratio between an input voltage and an output voltage, and may include a metal-oxide-semiconductor field-effect transistor (MOSFET) in order to implement an average inductor current mode method.

In operation, the switching converters use a drain voltage of the MOSFET to detect when the inductor current becomes zero. The drain voltage of the MOSFET decreases when the inductor current becomes zero. To detect this, the IC is typically implemented with costly elements that drive up manufacturing costs.

SUMMARY OF THE DISCLOSURE

According to aspects of the present disclosure, a switching control circuit includes a switching trigger unit that receives a sensing voltage, which senses a driving current that includes a first and second driving current sections, and that provides a first switching trigger signal based on the sensing voltage in the second current section, an off-time control unit that provides a second switching trigger signal in the first driving current section to control a maximum off-time of a driving switching element and a switching control unit that turns on the driving switching element based on the first or second switching trigger signal.

The switching control circuit may further include a pulse width control unit that provides a pulse width control signal at a turn-off time point of the driving switching element to control a pulse width of a switching control signal turning on the driving switching element. The switching trigger unit may provide the first switching trigger signal when the sensing voltage reaches a first trigger level.

The switching trigger unit may provide the first switching trigger signal in a boundary conduction mode when a ringing (or noise component) of the driving current is removed. The switching trigger unit may provide the first switching trigger signal in the boundary conduction mode when the sensing voltage reaches a predetermined negative level.

The off-time control unit may provide a minimum off-time control signal to prevent the driving switching element from turning on and to control a minimum off-time of the driving switching element during a time after the driving switching element is turned off. The off-time control unit may charge a capacitive element with a constant current during a section when the driving switching element is turned off.

The off-time control unit may provide the second switching trigger signal when a sawtooth wave voltage applied to the capacitive element reaches a predetermined first reference level. The off-time control unit may maintain the turn-off (or off state) of the driving switching element before the sawtooth wave voltage reaches a predetermined second reference level. The off-time control unit may initialize the sawtooth wave voltage when the driving switching element is turned on.

The switching trigger unit may include a buffer amplifier that controls an operation section of the sensing voltage. The buffer amplifier may include an inverting amplifier or a non-inverting amplifier.

When the buffer amplifier includes an inverting amplifier, the switching trigger unit may compare an output of the inverting amplifier and a predetermined second trigger level to detect a time point when the sensing voltage reaches the first trigger level. Whereas when the buffer amplifier includes a non-inverting amplifier, the switching trigger unit may compare an output of the non-inverting amplifier and a predetermined third trigger level to detect a time point when the sensing voltage reaches the first trigger level.

The switching control unit may turn on the driving switching element when a minimum off-time of the driving switching element passes and the sensing voltage reaches the first trigger level. The switching control unit may include a gate driver that outputs a switching control signal to turn on the driving switching element when the sensing voltage reaches the first trigger level or when a turn-off time of the driving switching element reaches a predetermined maximum off-time.

The switching control unit may include a storage element to provide the pulse width control signal to turn on or turn off the driving switching element based on an output change point of the switching trigger unit, the off-time control unit and the pulse width control unit.

According to a further aspect of the disclosure, a light emitting diode light apparatus includes an LED (light emitting diode) module, an inductor connected in series to the LED module, a driving switching element connected in series to the inductor and a switching control circuit that senses a driving current driving the LED module to provide a switching trigger signal when the driving current reaches a negative current, the switching control circuit includes a switching trigger unit that receives a sensing voltage that senses the driving current, which includes a first and second driving current sections, and that provides a first switching trigger signal based on the sensing voltage in the second driving current section, an off-time control unit that provides the second switching trigger signal in the first driving current section to control a maximum off-time of the driving switching element and a switching control unit that turns on the driving switching element based on the first and second switching trigger signal.

According to a still further aspect of the disclosure, a method for controlling turning on or off a driving switching element, the method comprising receiving a sensing voltage that senses the driving current, which includes a first and second driving current sections, and providing a first switching trigger signal based on the sensing voltage in the second driving current section, providing the second switching trigger signal in the first driving current section to control a maximum off-time of the driving switching element and turning on the driving switching element based on the first and second switching trigger signal.

This summary is provided to introduce a selection of concepts in a simplified form that are further described hereinbelow. This summary is not intended to identify key features or essential features of the claimed subject matter, nor is it intended to be used as an aid in determining the scope of the claimed subject matter.

According to the principles of the disclosure, a switching control circuit, a light apparatus having the same, and a method for driving the lighting apparatus may be implemented to detect a time point when a driving current reaches a zero level, without requiring costly components.

According to the principles of the disclosure, a switching control circuit, a light apparatus having the same, and a method for driving the lighting apparatus may detect a time point when a driving current reaches a zero level based on a sensing voltage sensing the driving current to control a turn-on time point of a driving switching element.

According to the principles of the disclosure, a switching control circuit, a light apparatus having the same, and a method for driving the lighting apparatus may include a boundary conduction mode and improve cost competitiveness without requiring costly components.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The following detailed description is provided to assist the reader in gaining a comprehensive understanding of the methods, apparatuses, and/or systems described herein. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Various changes, modifications, and equivalents of the systems, apparatuses and/or methods described herein will be apparent to one of ordinary skill in the art. Moreover, it is noted that like reference numerals represent similar parts throughout the several views of the drawings.

While terms such as "first," "second," and the like, may be used to describe various components, such components must not be understood as being limited to the terms. The terms are merely used to help the reader to distinguish one component from another.

It will be understood that when an element is referred to as being "connected to" or "connected with" another element, the element can be directly connected to the other element or intervening elements may also be present. In addition, unless explicitly described to the contrary, the word "comprise" and variations such as "comprises" or "comprising," or synonyms such as "including" or "having," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a," "an," and "the" in the present disclosure are intended to include the plural forms as well, unless the context clearly indicates otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1:
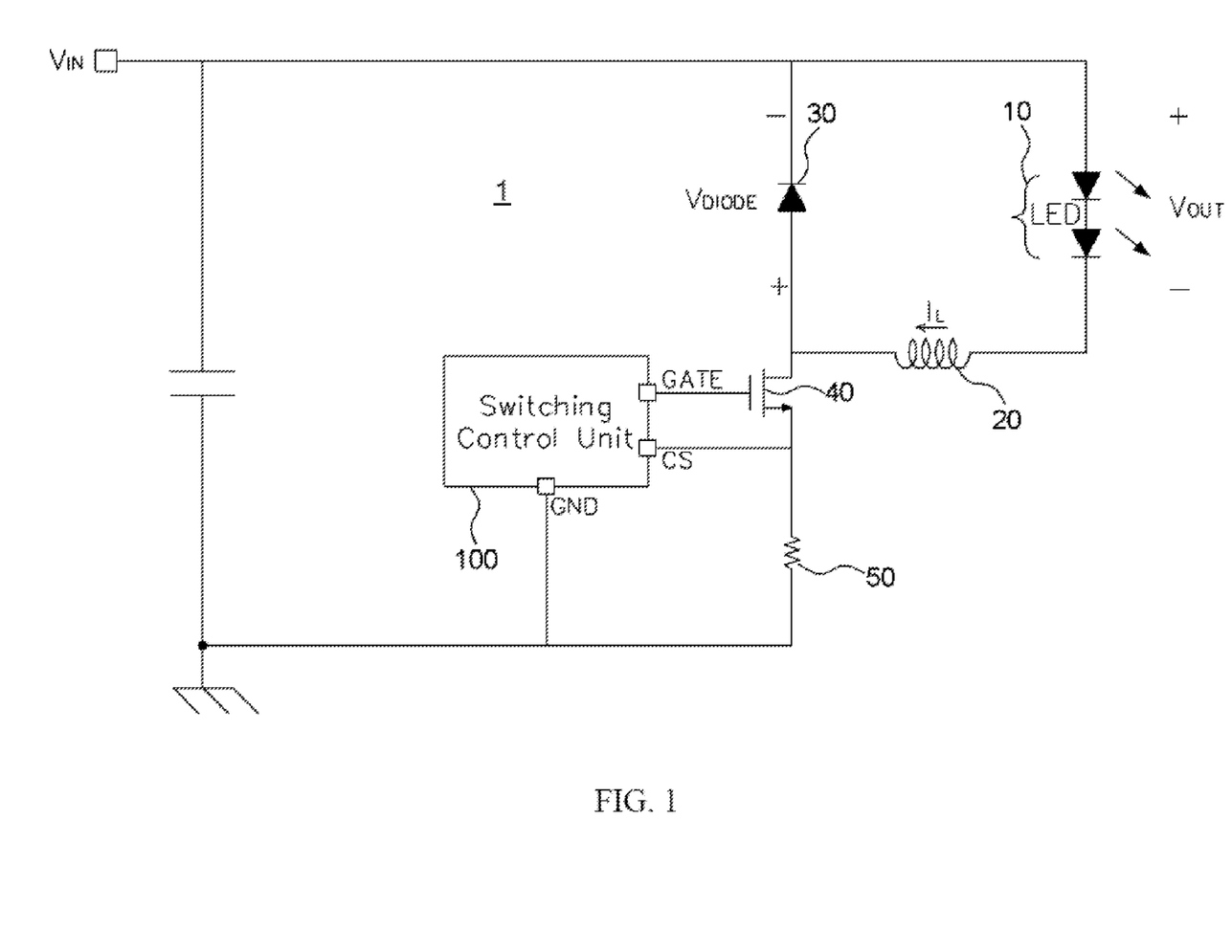
FIG. 1 shows a circuit diagram of an example of a lighting apparatus implemented with a switching control circuit constructed according to the principles of the disclosure.

FIG. 1 shows a circuit diagram of an example of a lighting apparatus 1 implemented with a switching control circuit 100 constructed according to the principles of the disclosure.

The lighting apparatus 1 may be a light emitting diode (LED) lighting apparatus. The LED lighting apparatus 1 may include an LED module 10, an inductor 20, a diode 30, a driving switching element 40, a sensing resistance 50, and the switching control circuit 100.

The LED lighting apparatus 1 may receive an input voltage $V_{IN}$ from an input power supply (not shown), which may be a source of the input voltage $V_{IN}$. The input voltage $V_{IN}$ may be a DC voltage $V_{DC}$ or an AC voltage $V_{AC}$. When the input voltage $V_{IN}$ is the DC voltage $V_{DC}$, the input power supply may provide a stable DC power supply $V_{DC}$. When the input voltage $V_{IN}$ is the AC voltage $V_{AC}$, a frequency of the AC input voltage $V_{AC}$ may have a frequency of, for example, about 50 Hz or about 60 Hz.

The LED lighting apparatus 1 may be driven through a switching converter method. The LED lighting apparatus 1 may be driven via a buck-type switching method, but other switching methods are also contemplated, such as, for example, boost-type, buck-boost-type, or the like.

The LED module 10 may be divided into n groups (n is a positive, non-zero integer), and each group may include one or more LEDs connected in series, parallel, or seriesparallel. The LED module 10 may be driven by the input voltage $V_{IN}$. The LED lighting apparatus 1 may control an output voltage $V_{OUT}$ and a driving current $I_L$ to regulate a brightness of the LED module 10. The output voltage $V_{OUT}$ may be a voltage applied to the LED module 10, and the driving current $I_L$ may drive the LED module 10. When the driving switching element 40 is turned on, the driving current $I_L$ may correspond to a current flowing through the driving switching element 40.

The driving current $I_L$ may include first and second driving current sections, which are explained below in detail with reference to FIG. 5. The driving current $I_L$ may generate a ringing component in the first driving current section. The ringing component may be a noise signal that is applied to the driving current. The ringing component may be removed to implement a boundary conduction mode in the second driving current section.

The inductor 20 may be connected in series with the LED module 10. The driving switching element 40 may be connected to the inductor 20, the diode 30, the switching control circuit 100 and/or the like. The driving switching element 40 may receive a switching control signal from the switching control circuit 100 that turns on or off the driving switching element 40. When the driving switching element 40 is turned on, the driving current $I_L$ may flow into the sensing resistance 50. When the driving switching element 40 is turned off, a flow of the driving current $I_L$ to the sensing resistance 50 may be cut off. Therefore, the LED lighting apparatus 1 may control the output voltage $V_{OUT}$ and the driving current $I_L$ using the switching control signal.

When the driving switching element 40 is turned on, the driving current $I_L$ may flow through the driving switching element 40 and the inductor 20 may be charged by the driving current $I_L$. When the driving switching element 40 is turned off, the current charged in the inductor 20 may be discharged to the LED module 10 through the diode 30.

Hence, while the driving switching element 40 is turned off, the inductor 20 may operate as a current source providing the driving current $I_L$.

The driving switching element 40 may include a power MOSFET, and the switching control signal may be provided to a gate terminal of the power MOSFET from a gate pin (GATE) of the switching control element 100 to control the flow of the driving current $I_L$. The driving switching element 40 may be turned on when the switching control signal provides a positive value (high level or 1) and may be turned off when the switching control signal provides a negative value (low level or 0).

The sensing resistance 50 may be connected to the driving switching element 40, the switching control circuit 100, and/or the like. A sensing voltage $V_{CS}$ applied to the sensing resistance 50 may also be applied to the switching control circuit 100 through a sensing pin (CS). The sensing resistance 50 may be connected to the driving switching element 40 for sensing the driving current $I_L$ passing through the driving switching element 40. The driving current $I_L$ may be sensed (or determined) from the following relationship $I_L=V_{CS}/R$, where R is the resistance value of the sensing resistance 50.

Figure 2:
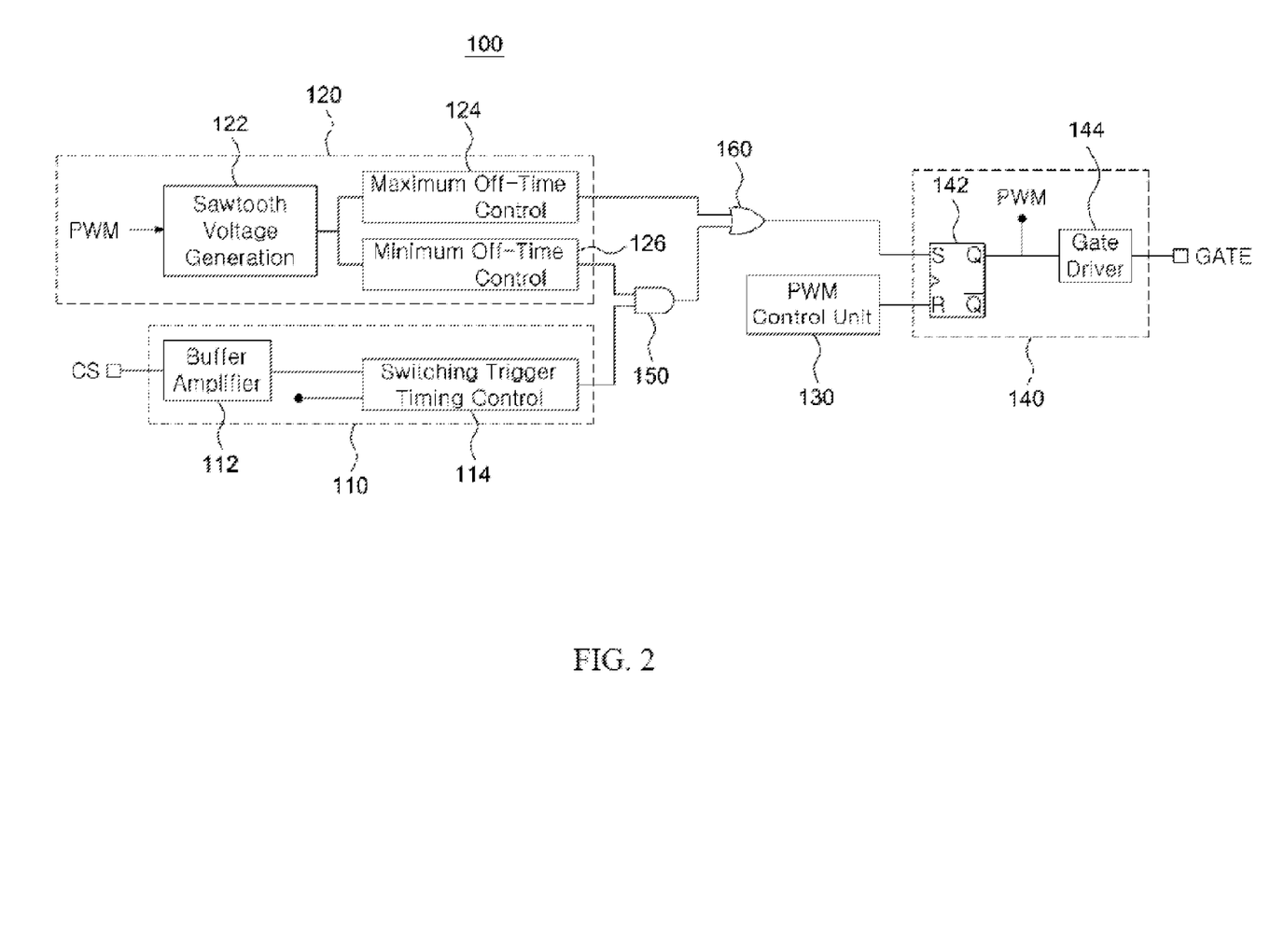
FIG. 2 shows a block diagram of an example of the switching control circuit shown in FIG. 1, constructed according to the principles of the disclosure.

FIG. 2 shows a block diagram of an example of the switching control circuit 100 shown in FIG. 1. The switching control circuit 100 may include a switching trigger unit 110, an off-time control unit 120, a pulse width control unit 130, a switching control unit 140, an AND gate 150, an OR gate 160, and/or the like.

The switching trigger unit 110 may receive the sensing voltage $V_{CS}$ sensing the driving current $I_L$ and may provide a first switching trigger signal based on the sensing voltage $V_{CS}$ in the second driving current section. More specifically, the switching trigger unit 110 may include a buffer amplifier 112 and a switching trigger control module 114. The buffer amplifier 112 may receive the sensing voltage $V_{CS}$ through the CS pin. The buffer amplifier 112 may control an operation section of the sensing voltage $V_{CS}$ and may decrease a variation of an oscillation frequency. In one embodiment, the buffer amplifier 112 may be embodied in or as an inverting amplifier or a non-inverting amplifier.

The switching trigger unit 110 may provide a first switching trigger signal when the sensing voltage $V_{CS}$ reaches a first trigger level and the first switching trigger signal may correspond to an edge clock for turning on the driving switching element 40 in the second driving current section. The switching trigger control module 114 may compare an output of the buffer amplifier 112 and a predetermined second trigger level to detect a time point when the sensing voltage $V_{CS}$ reaches the first trigger level. Herein, the first trigger level may correspond to the negative value and the sensing voltage $V_{CS}$ may reach the first trigger level in the second driving current section. The second trigger level may correspond to the positive value and may be designed for detecting the time point when the sensing voltage $V_{CS}$ reaches the first trigger level. That is, the second trigger level may be predetermined by a designer and may be determined dependent on the first trigger level and an element value of the buffer amplifier.

In another embodiment, when the buffer amplifier 112 is embodied in or as a non-inverting amplifier, the switching trigger unit 110 may compare the output of the non-inverting amplifier and the predetermined third trigger level to detect the time point when the sensing voltage $V_{CS}$ reaches the first trigger level.

The off-time control unit 120 may include a sawtooth wave voltage generation module 122, a maximum off-time control module 124 and a minimum off-time control module 126. The sawtooth wave voltage generation module 122 may generate a sawtooth voltage based on a pulse width modulation signal PWM. The sawtooth wave voltage generation module 122 may provide the sawtooth wave voltage to the maximum off-time control module 124 and the minimum off-time control module 126.

The maximum off-time control module 124 may provide the second switching trigger signal in the first driving current section to control a maximum off-time of the driving switching element 40. The second switching trigger signal may correspond to the edge clock for turning on the driving switching element 40 in the first driving current section. The maximum off-time control module 124 may provide the second switching trigger signal to a first terminal of the OR gate 160.

The minimum off-time control module 126 may provide a minimum off-time control signal to a first terminal of the AND gate 150 for preventing the turn-on (or on state) of the driving switching element 40 during a certain time after the driving switching element 40 is turned off. The minimum off-time control module 126 may control a minimum off-time of the driving switching element 40 based on a minimum off-time control signal. In one embodiment, the AND gate 150 may receive the minimum off-time control signal and the first trigger signal to output the positive value (high level or 1). That is, the AND gate 150 may output the positive value when the minimum off-time of the driving switching element 40 passes and the sensing voltage $V_{CS}$ reaches the first trigger level.

The OR gate 160 may receive outputs of the maximum off-time control module 124 and the AND gate 150. The OR gate 160 may output the positive value when the OR gate 160 receives the second switching trigger signal from the maximum off-time control module 124 or receives the positive value from the AND gate 150. That is, the OR gate 160 may output the positive value when the sensing voltage $V_{CS}$ reaches the first trigger level or the turn-off time of the driving switching element 40 reaches the predetermined maximum off-time.

The pulse width control unit 130 may provide a pulse width control signal at a turn-off time point of the driving switching element 40 for controlling a pulse width of the switching control signal. More specifically, when the driving switching element 40 is turned on, the pulse width control unit 130 may receive the sensing voltage $V_{CS}$ generated by the driving current $I_L$ passing the driving switching element 40 through the CS pin. The pulse width control unit 130 may provide the pulse width control signal at the turn-off time point of the driving switching element 40 based on the sensing voltage $V_{CS}$.

The switching control unit 140 may include a storage element 142 and a gate driver 144. The switching control unit 140 may provide the switching control signal to the driving switching element 40 through the GATE pin at the turn-on or the turn-off time point of the driving switching element 40. The switching control unit 140 may provide the switching control signal turning on the driving switching element 40 based on first and second switching trigger signals. Also, the switching control unit 140 may provide the switching control signal turning off the driving switching element 40 based on the pulse width control signal.

The storage element 142 may be electrically connected with the switching trigger unit 110, the off-time control unit 120 and the pulse width control unit 130. The storage element 142 may provide the output value for turning on or turning off the driving switching element 40 based on an output change point of the switching trigger unit 110, the off-time control unit 120 and the pulse width control unit 130.

The gate driver 144 may receive the output value of the storage element 142 to output the switching control signal. The switching control signal may be provided to the driving switching element 40 through the GATE pin. The gate driver 144 may amplify an output of the storage element 142 up to a voltage needed to the turn-on or turn-off of the driving switching element 40 and may output the switching control signal at a low impedance. The gate drive 144 may rapidly provide the switching control signal to the driving switching element 40 based on the output value change of the storage element 142.

In one embodiment, the storage element 142 may be embodied as an SR latch. For example, when the storage element 142 receives the positive value (high level or 1) through S terminal from the OR gate 160, the storage element 142 may output the positive value (high level or 1) turning on the driving switching element 40. Whereas, when the storage element 142 receives the pulse width control signal through R terminal from the pulse width control unit 130, the storage element 142 may output a negative value (low level or 0) turning off the driving switching element 40. That is, the gate driver 144 may output the switching control signal based on the output value of the storage element 142.

Figure 3:
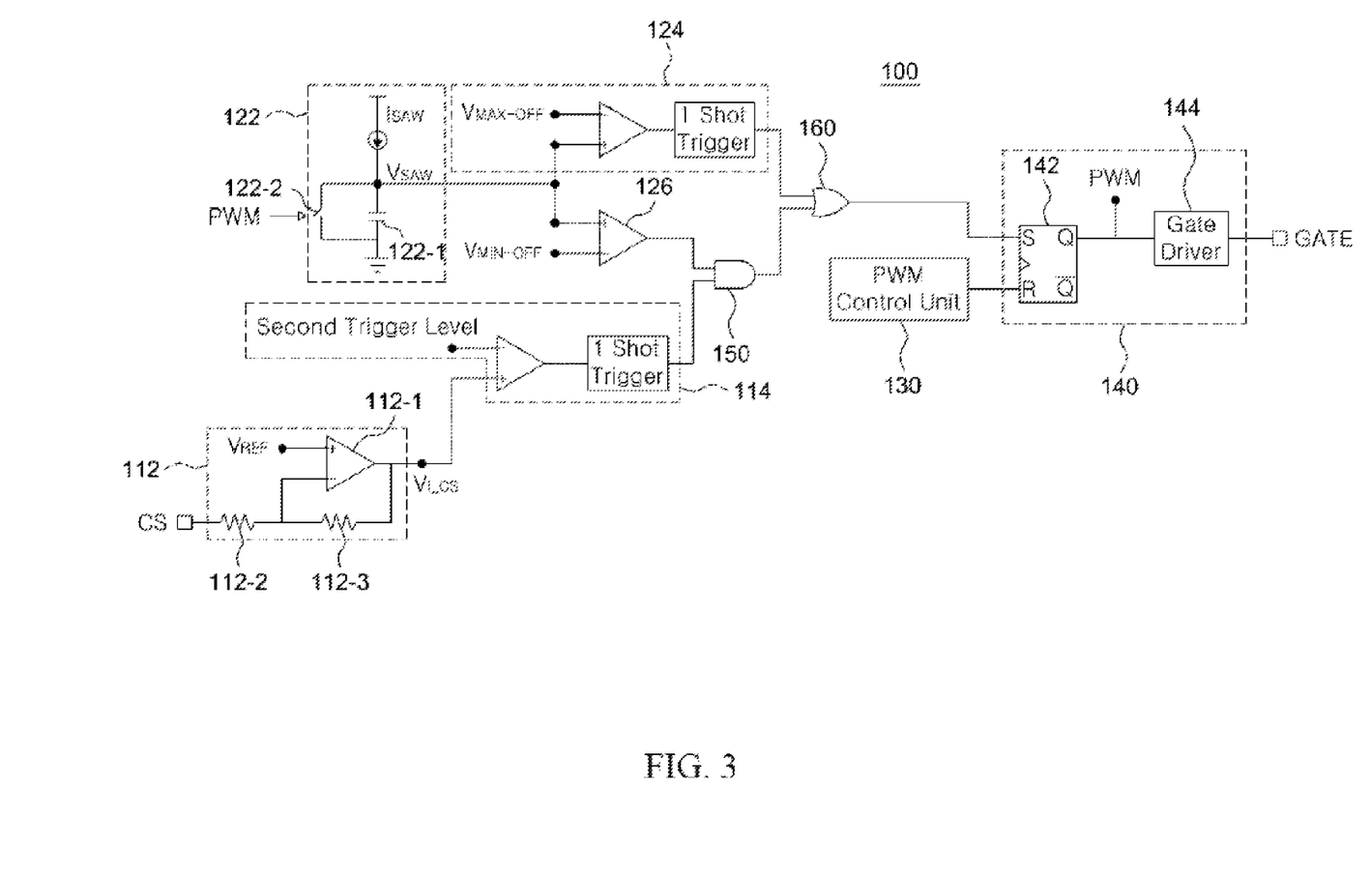
FIG. 3 shows a circuit diagram of an example of the switching control circuit shown in FIG. 1, constructed according to the principles of the disclosure.

FIG. 3 is a circuit diagram illustrating a switching control circuit in FIG. 1.

Referring to FIG. 3, the buffer amplifier 112 may be embodied in the inverting amplifier. When the buffer amplifier 112 may be embodied in the inverting amplifier, the buffer amplifier 112 may include a first comparator 112-1, a first and a second resistance 112-2, 112-3. The buffer amplifier 112 may receive the sensing voltage $V_{CS}$ through the CS pin to reverse the sensing voltage $V_{CS}$. In one embodiment, the switching control circuit 100 may detect the time point when the sensing voltage $V_{CS}$ reaches the negative voltage for detecting the time point when the driving current $I_L$ reaches the negative voltage. That is, the buffer amplifier 112 may output an inverting voltage $V_{I\_CS}$ for detecting that a negative sensing voltage $V_{CS}$ reaches the first trigger level.

The switching trigger control module 114 may receive the inverting voltage $V_{I\_CS}$ to detect the time point when the inverting voltage $V_{I\_CS}$ reaches the second trigger level. When the inverting voltage $V_{I\_CS}$ reaches the second trigger level, the switching trigger control module 114 may output the first switching trigger signal. More specifically, the switching trigger control module 114 may compare the inverting voltage $V_{I\_CS}$ and the second trigger level to detect the time point when the sensing voltage $V_{CS}$ reaches the first trigger level.

The sawtooth wave voltage generation module 122 may include a capacitive element 122-1 and a discharge switching element 122-2. In one embodiment, the sawtooth wave voltage generation module 122 may charge the capacitive element 122-1 with a constant current $I_{SAW}$ during the section when the driving switching element 40 is turned off. More specifically, when the driving switching element 40 is turned off, the discharge switching element 122-2 may be turned off. Herein, the discharge switching element 122-2 may be turned on based on the pulse width modulation signal PWM. When the discharge switching element 122-2 is turned off, the capacitive element 122-1 may be charged by the constant current $I_{SAW}$ and the sawtooth wave voltage $V_{SAW}$ may be applied to the capacitive element 122-1. The constant current $I_{SAW}$ may have constant level and the sawtooth wave voltage $V_{SAW}$ may linearly increase.

In one embodiment, the sawtooth wave voltage generation module 122 may initialize the sawtooth wave voltage $V_{SAW}$ when the driving switching element 40 is turned on. More specifically, the capacitive element 122-1 may be instantaneously discharged when the discharge switching element 122-2 is turned on. When the discharge switching element 122-2 is turned on, the constant current $I_{SAW}$ may not be charged to the capacitive element 122-1 to flow through a ground and the sawtooth wave voltage $V_{SAW}$ applied to the capacitive element 122-1 may be initialized.

As a result, the sawtooth wave voltage generation module 122 may provide the sawtooth wave voltage $V_{SAW}$ to the maximum off-time control module 124 and the minimum off-time control module 126. The maximum off-time control module 124 and the minimum off-time control module 126 may control the off-time of the driving switching element 40 based on the sawtooth wave voltage $V_{SAW}$.

The maximum off-time control module 124 may provide the second switching trigger signal in the first driving current section to control the maximum off-time of the driving switching element 40. More specifically, the maximum off-time control module 124 may receive the sawtooth wave voltage $V_{SAW}$ from the sawtooth wave voltage generation module 122 to compare with a predetermined first reference level $V_{MAX\_OFF}$. The maximum off-time control module 124 may provide the second switching trigger signal when the sawtooth wave voltage $V_{SAW}$ reaches the first reference level $V_{MAX\_OFF}$. Herein, the first reference level $V_{MAX\_OFF}$ may be predetermined for assigning the maximum off-time of the driving switching element 40.

The minimum off-time control module 126 may control the minimum off-time of the driving switching element 40 based on the minimum off-time control signal. More specifically, the minimum off-time control module 126 may receive the sawtooth wave voltage $V_{SAW}$ from the sawtooth wave voltage generation module 122 to compare with a predetermined second reference level $V_{MIN\_OFF}$. The minimum off-time control module 126 may provide the minimum off-time control signal when the sawtooth wave voltage $V_{SAW}$ reaches the predetermined second reference level $V_{MIN\_OFF}$. The minimum off-time control module 126 may output the positive value from the time point when the sawtooth voltage $V_{SAW}$ reaches the second reference level $V_{MIN\_OFF}$ to the time point when the driving switching element 40 is turned off. The minimum off-time control module 126 may maintain the turn-off of the driving switching element 40 before the sawtooth wave voltage reaches the second reference level. In one embodiment, when the driving switching element 40 is turned off, the sensing voltage $V_{CS}$ is influenced by a switching noise and the minimum off-time control module 126 may prevent an incorrect operation by the switching noise.

Figure 4:
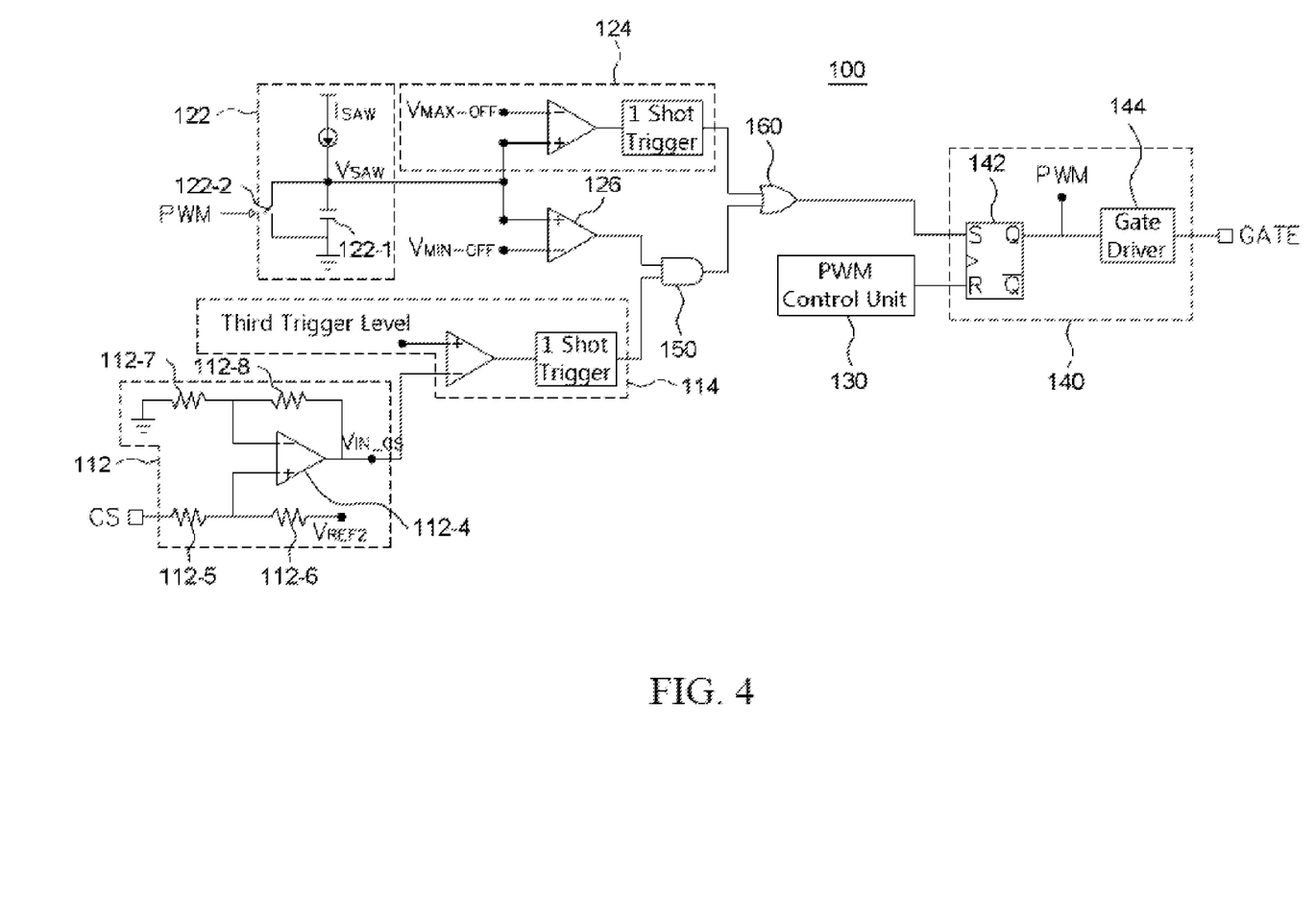
FIG. 4 shows a circuit diagram of another example of the switching control circuit shown in FIG. 1, constructed according to the principles of the disclosure.

FIG. 4 is a circuit diagram illustrating a switching control circuit that a buffer amplifier of a switching control circuit is embodied in a non-inverting amplifier in FIG. 1.

Referring to FIG. 4, the buffer amplifier 112 may be embodied in the non-inverting amplifier. When the buffer amplifier 112 is embodied in the non-inverting amplifier, the buffer amplifier may include a second comparator 112-4, third to six resistances (112-5-112-8). The buffer amplifier 112 may receive the sensing voltage $V_{CS}$ through the CS pin to output the non-inverting voltage $V_{NI\_CS}$ whose phase is identical to phase of the sensing voltage $V_{CS}$. The switching trigger unit 120 may compare an output $V_{NI\_CS}$ of the non-inverting amplifier and the predetermined third trigger level to detect the time point when the sensing voltage $V_{CS}$ reaches the first trigger level.

In one embodiment, when the sensing voltage $V_{CS}$ reaches the negative voltage, the non-inverting voltage $V_{NI\_CS}$ may correspond to the positive voltage ($V_{NI\_CS}=V_{REF2}+V_{CS}$). That is, the buffer amplifier 112 may provide the second reference voltage $V_{REF2}$ to negative sensing voltage $V_{CS}$ to output the non-inverting voltage $V_{NI\_CS}$ and a range of the non-inverting voltage $V_{NI\_CS}$ may be included in an operation section of the second comparator 112-4.

In one embodiment, the switching trigger control module 114 may receive the non-inverting voltage $V_{NI\_CS}$ to detect the time point when the non-inverting voltage $V_{NI\_CS}$ reaches the third trigger level. When the non-inverting voltage $V_{NI\_CS}$ reaches the third trigger level, the switching trigger control module 114 may output the first switching trigger signal.

Figure 5:
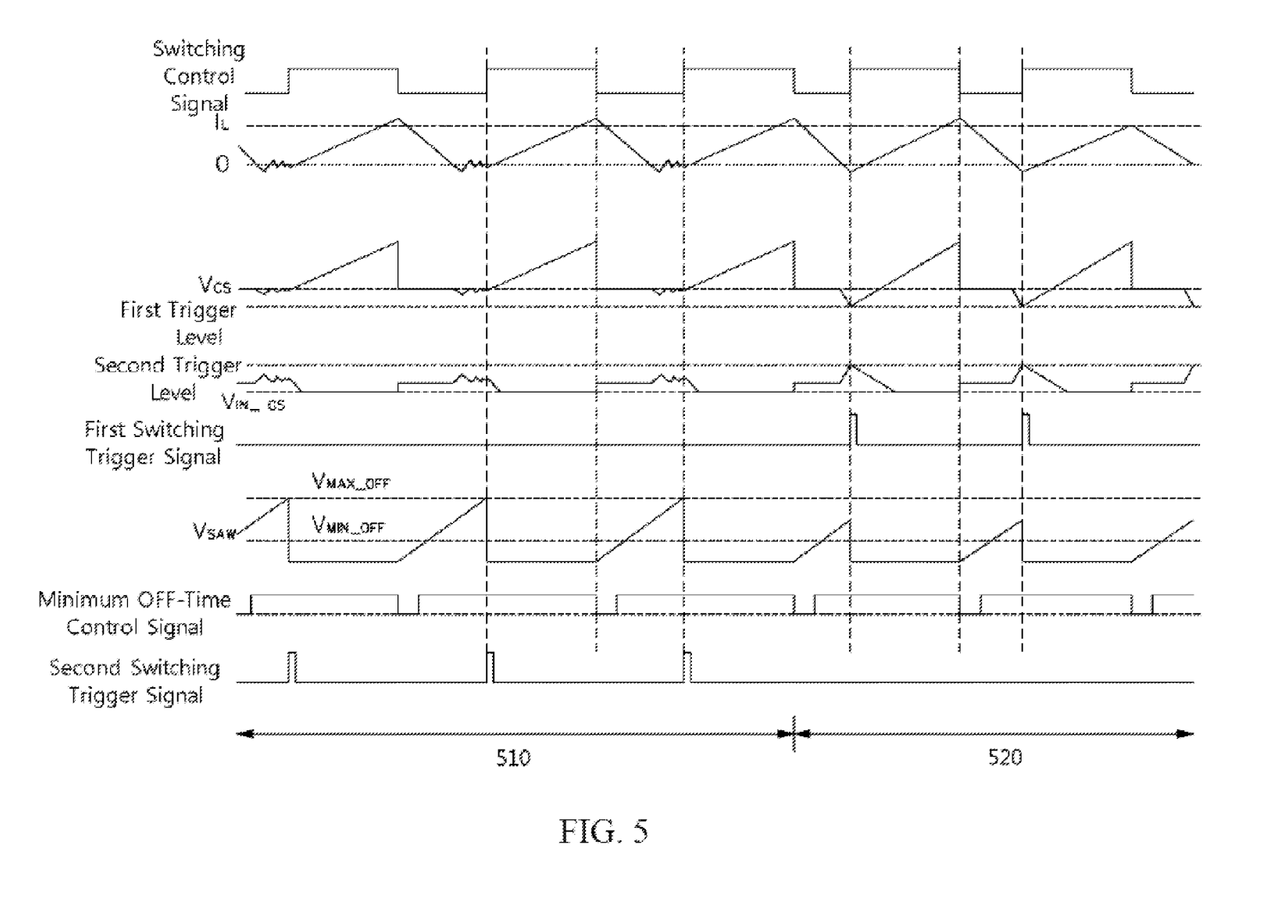
FIG. 5 shows a waveform diagram of an example of an operation of the switching control circuit and the light apparatus shown in FIG. 1 according to the principles of the disclosure.

FIG. 5 is a waveform diagram illustrating an operation of a switching control circuit and a light apparatus having the same in FIG. 1 to FIG. 4.

In one embodiment, the driving current $I_L$ may include first and second driving current sections (510, 520). The driving current $I_L$ may generate the ringing (or noise) component in the first driving current section 510, however the ringing component is removed in the second driving current section 520 to be embodied.

When the driving switching element 40 is turned on, the driving current $I_L$ may flow through the driving switching element 40 and may increase with a constant slope. In one embodiment, an increase slope of the driving current $I_L$ may be proportional to a voltage applied to a terminal between the inductor 20 and the LED module 10 and may be inversely proportional to an inductance L of the inductor 20. At the time point when the driving switching element 40 is turned on, a voltage of $[V_{IN}-V_{OUT}]$ may be applied to the terminal between the inductor 20 and the LED module 10. That is, the increase slope of the driving current $I_L$ may correspond to $[(V_{IN}-V_{OUT})/L]$ (L is an inductance).

Whereas, the driving current $I_L$ may flow into the LED module 10 through the diode 30 when the driving switching element 40 is turned off. That is, the driving current $I_L$ may flow into the LED module 10 through the diode 30 by a voltage $V_{DIODE}$ applied to the diode 30. When a driving switching element 40 is turned off, a current charged in the inductor 20 is discharged. As a result, the driving current $I_L$ may decrease with a constant slope.

In one embodiment, a decrease slope of the driving current $I_L$ may be proportional to the voltage applied to the LED module 10 and may be inversely proportional to the inductance of the inductor 20. In FIG. 1, a voltage of $[V_{OUT}]$ may be applied to of the LED module 10. That is, the decrease slope of the driving current $I_L$ may correspond to $[-V_{OUT}/L]$ (L is the inductance). More specifically, when the driving current $I_L$ reaches a zero, the voltage applied to the inductor 20 may be zero. Therefore, the driving current $I_L$ may continuously decrease after reaching a zero current and may reach a minimum peak level at the turn-on time point of the driving switching element 40.

In one embodiment, when the driving switching element 40 is turned off, the drain voltage $V_D$ may maintain the constant voltage of $[V_{IN}+V_{DIODE}]$ and when the driving current $I_L$ falls below a certain current (or the zero current), the drain voltage $V_D$ may rapidly decrease. When the drain voltage $V_D$ rapidly decreases to be identical with the voltage ($V_D=V_{IN}-V_{OUT}$) applied to a terminal between the inductor 20 and the LED module 10 ($V_{IN}-V_{OUT}$), the driving switching element 40 may be turned on and the driving current $I_L$ may increase with the constant slope.

In one embodiment, when the driving switching element 40 is turned on, the driving current $I_L$ increases. As a result, the sensing voltage $V_{CS}$ may increase with the constant slope. When the driving switching element 40 is turned off, the driving current $I_L$ doesn't flow through the sensing resistance 50. As a result, the sensing voltage $V_{CS}$ may maintain the zero voltage.

In one embodiment, when the buffer amplifier 112 is embodied in the inverting amplifier, the buffer amplifier 112 inverts the sensing voltage $V_{CS}$ to output the inverting voltage $V_{I\_CS}$. A phase of the inverting voltage $V_{I\_CS}$ may be an opposite to a phase of the sensing voltage $V_{CS}$.

In one embodiment, when the sensing voltage $V_{CS}$ reach the negative voltage, the inverting voltage $V_{I\_CS}$ may correspond to the positive voltage ($V_{I\_CS}=2*V_{REF}-V_{CS}$). Whereas, the sensing voltage corresponds to the positive voltage and a level of the sensing voltage $V_{CS}$ is larger than a double reference voltage ($V_{CS}>2*V_{REF}$), the inverting voltage $V_{I\_CS}$ may correspond to the zero voltage.

In one embodiment, when the driving switching element 40 is turned off, the sawtooth wave voltage $V_{SAW}$ may be charged by the constant current $I_{SAW}$ and when the driving switching element 40 is turned on, the sawtooth wave voltage $V_{SAW}$ may be instantaneously discharged. The sawtooth wave voltage $V_{SAW}$ may increase up to a first reference level $V_{MAX\_OFF}$ in the first driving current section and the maximum off-time control module 124 may provide the second switching trigger signal at the time point when the sawtooth wave voltage $V_{SAW}$ reaches the first reference level $V_{MAX\_OFF}$. Whereas, the turn-off time of the switching control signal in the second driving current section 520 may be shorter than in the first driving current section 510 and a charging time of the sawtooth wave voltage $V_{SAW}$ may also decrease. That is, the sawtooth wave voltage $V_{SAW}$ in the second driving current section 520 may be initialized before reaching the first reference level $V_{MAX\_OFF}$. As a result, the maximum off-time control module 124 may provide the second switching trigger signal to a first terminal of the AND gate 150 in the first driving current section 510.

In one embodiment, the sensing voltage $V_{CS}$ may reach the first trigger level in the second driving current section 520 and the inverting voltage $V_{I\_CS}$ may reach the second trigger level in the second driving current section 520. When the sensing voltage $V_{CS}$ reaches the predetermined negative level, the switching trigger unit 110 may provide the first switching trigger signal for embodying the boundary conduction mode. Herein, the first trigger level may correspond to the negative voltage and the second trigger level may correspond to the positive voltage. When the inverting voltage $V_{I\_CS}$ reaches the second trigger level in the second driving current section 520, the switching trigger unit 110 may provide the first switching trigger signal to a first terminal of the OR gate 160.

Figure 6:
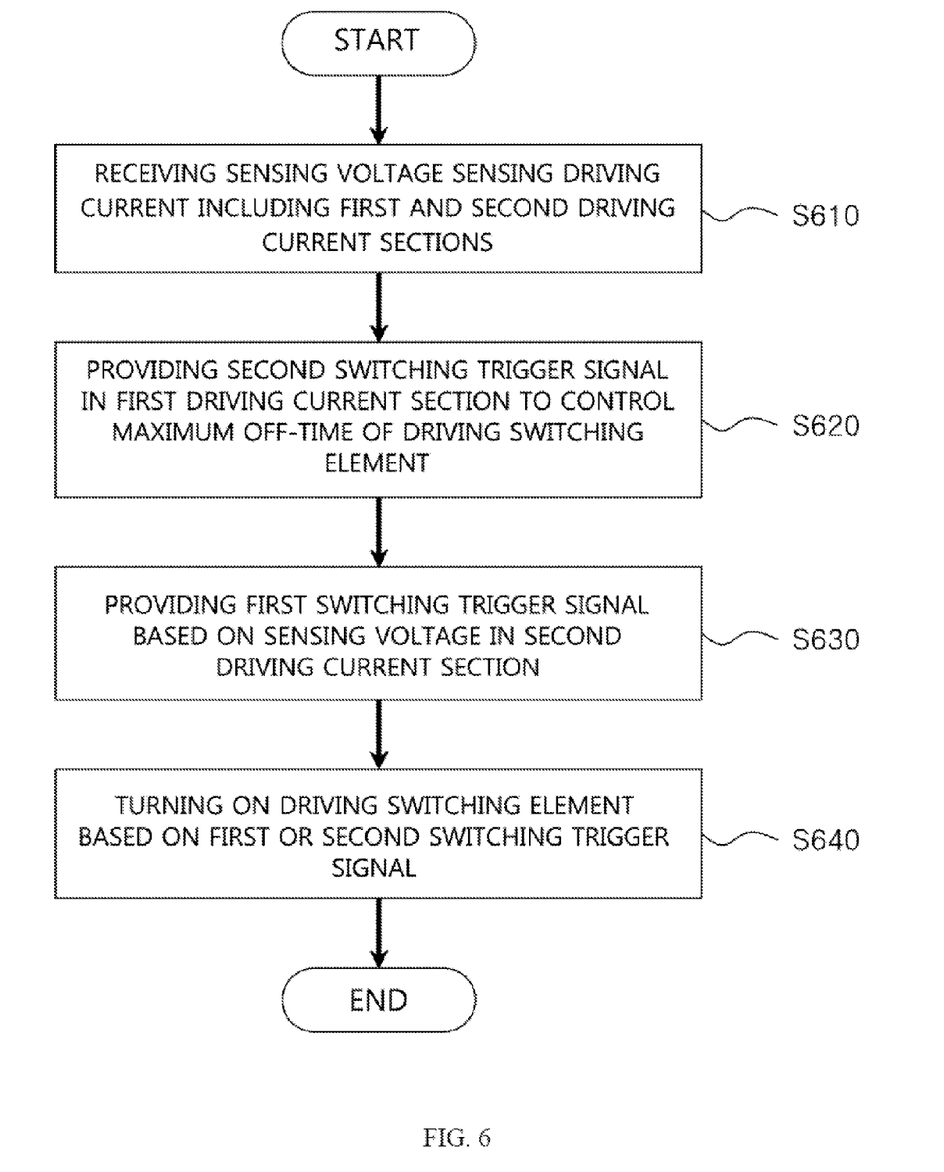
FIG. 6 shows a flow chart of an example of a driving method of the switching control circuit and the lighting apparatus shown in FIG. 1 according to the principles of the disclosure.

FIG. 6 is a flow chart illustrating a driving method of a switching control circuit and a light apparatus having the same in FIG. 1.

The switching trigger unit 110 may receive the sensing voltage $V_{CS}$ sensing the driving current $I_L$ including first and second driving current sections (510, 520). The sensing voltage $V_{CS}$ may be applied to the switching trigger unit 110 through the CS pin (step S610).

The off-time control unit 120 may provide the second switching trigger signal in the first driving current section 510 to control the maximum off-time of the driving switching element 40. Also, the off-time control unit 120 may prevent the turn-on of the driving switching element 40 during the certain time after the driving switching element 40 is turned off (step S620).

The switching trigger unit 110 may provide the first switching trigger signal based on the sensing voltage $V_{CS}$ in the second driving current section 520 (step S630).

The switching control unit 140 may turn on the driving switching element 40 based on the first or the second switching trigger signal. That is, the switching control unit 140 may turn on the driving switching element 40 when the sensing voltage $V_{CS}$ reaches the first trigger level or the turn-off time of the driving switching element 40 reaches the predetermined maximum off-time (step S640).

Therefore, the switching control circuit 100 and the light apparatus having the same may not use the external high internal pressure element to detect the time point when the driving current reaches the zero and to control the turn-on time point of the driving switching element. Also, the switching control circuit 100 and the light apparatus having the same may not use the external high internal pressure element to embody the boundary conduction mode and to improve the cost competitiveness.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A switching control circuit, comprising:
   a switching trigger unit that receives a sensing voltage representing a driving current during a first driving current section and a second driving current section, wherein the switching trigger unit provides a first switching trigger signal based on the sensing voltage in the second driving current section;
   an off-time control unit that provides a second switching trigger signal in the first driving current section to control a maximum off-time of a driving switching element; and
   a switching control unit that turns on the driving switching element based on the first switching trigger signal or the second switching trigger signal.

2. The switching control circuit of claim 1, further comprising:
   a pulse width control unit that provides a pulse width control signal at a turn-off time point of the driving switching element to control a pulse width of a switching control signal that turns on or off the driving switching element.

3. The switching control circuit of claim 1, wherein the switching trigger unit provides the first switching trigger signal when the sensing voltage reaches a first trigger level.

4. The switching control circuit of claim 1, wherein the switching trigger unit provides the first switching trigger signal in a boundary conduction mode when a ringing component is removed from the driving current.

5. The switching control circuit of claim 1, wherein the switching trigger unit provides the first switching trigger signal in a boundary conduction mode when the sensing voltage reaches a predetermined negative level.

6. The switching control circuit of claim 1, where in the off-time control unit provides a minimum off-time control signal that prevents the driving switching element from turning on during a time after the driving switching element is turned off to control a minimum off-time of the driving switching element.

7. The switching control circuit of claim 1, wherein the off-time control unit charges a capacitive element with a constant current during a section when the driving switching element is turned off.

8. The switching control circuit of claim 7, wherein the off-time control unit provides the second switching trigger signal when a sawtooth wave voltage applied to the capacitive element reaches a first reference level.

9. The switching control circuit of claim 8, wherein the off-time control unit maintains the driving switching element in an off state before the sawtooth wave voltage reaches a predetermined second reference level.

10. The switching control circuit of claim 8, wherein the off-time unit initializes the sawtooth wave voltage when the driving switching element is turned on.

11. The switching control circuit of claim 1, wherein the switching trigger unit includes a buffer amplifier that controls an operation section of the sensing voltage.

12. The switching control circuit of claim 11, wherein the buffer amplifier includes an inverting amplifier or a non-inverting amplifier.

13. The switching control circuit of claim 12, wherein the buffer amplifier comprises the inverting amplifier, and wherein the switching trigger unit compares an output of the inverting amplifier and a predetermined second trigger level to detect a time point when the sensing voltage reaches the first trigger level.

14. The switching control circuit of claim 12, wherein the buffer amplifier comprises the non-inverting amplifier, and wherein the switching trigger unit compares an output of the non-inverting amplifier and a predetermined third trigger level to detect a time point when the sensing voltage reaches the first trigger level.

15. The switching control circuit of claim 1, wherein the switching control unit turns on the driving switching element when a minimum off-time of the driving switching element passes and the sensing voltage reaches the first trigger level.

16. The switching control circuit of claim 1, wherein the switching control unit includes a gate driver that outputs a switching control signal to turn in the driving switching element when the sensing voltage reaches the first trigger level or when a turn-off time of the driving switching element reaches a predetermined maximum off-time.

17. The switching control circuit of claim 2, wherein the switching control unit includes a storage element that provides the pulse width control signal to turn on or turn off the driving switching element based on an output change point of the switching trigger unit, the off-time control unit and the pulse width control unit.

18. A light emitting diode (LED) lighting apparatus, comprising:
an LED module that generates a lighting signal;
an inductor connected in series to the LED module;
a driving switching element connected in series to the inductor; and
a switching control circuit that senses a driving current driving the LED module to provide a switching trigger signal when the driving current reaches a negative current, wherein the switching control circuit comprises:
a switching trigger unit that receives a sensing voltage representing the driving current during a first driving current section and a second driving current section, wherein the switching trigger unit provides a first switching trigger signal based on the sensing voltage during the second current section;
an off-time control unit that provides a second switching trigger signal during the first driving current section to control a maximum off-time of the driving switching element; and
a switching control unit that turns on the driving switching element based on the first switching trigger signal or the second switching trigger signal.

19. A method for controlling turning on or off a driving switching element, the method comprising:
receiving a sensing voltage representing a driving current during a first driving current section and a second driving current section;
providing a first switching trigger signal based on the sensing voltage in the second driving current section;
providing a second switching trigger signal in the first driving current section to control a maximum off-time of the driving switching element; and
turning on the driving switching element based on the first switching trigger signal or the second switching trigger signal.

20. The method of claim 19, further comprising:
providing a pulse width control signal at a turn-off time point of the driving switching element to control a pulse width of a switching control signal that turns on or off the driving switching element.

* * * * *